United States Patent
Ferreira et al.

(10) Patent No.: US 11,248,179 B2
(45) Date of Patent: Feb. 15, 2022

(54) DEWAXING AND DEAROMATIZATION PROCESS OF HYDROCARBON IN A SLURRY REACTOR

(71) Applicant: TOTAL MARKETING SERVICES, Puteaux (FR)

(72) Inventors: Cristina Ferreira, Paris (FR); Serge Cukierman, Neuilly-sur-Seine (FR); Carole Dupuy, Issy-les-Moulineaux (FR); Guillaume Lemarchand, Chamblon (CH); Raphael Siggen, Aigle (CH)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 16/474,418

(22) PCT Filed: Dec. 29, 2017

(86) PCT No.: PCT/EP2017/084813
§ 371 (c)(1),
(2) Date: Jun. 27, 2019

(87) PCT Pub. No.: WO2018/127458
PCT Pub. Date: Jul. 12, 2018

(65) Prior Publication Data
US 2019/0345398 A1    Nov. 14, 2019

(30) Foreign Application Priority Data
Jan. 3, 2017  (EP) ..................... 17150206

(51) Int. Cl.
*C10G 45/64* (2006.01)
*B01J 8/08* (2006.01)
(Continued)

(52) U.S. Cl.
CPC .............. *C10G 45/64* (2013.01); *B01J 8/087* (2013.01); *B01J 8/10* (2013.01); *C10G 45/48* (2013.01);
(Continued)

(58) Field of Classification Search
CPC .............. B01J 19/18; B01J 2208/00141; B01J 2208/00867; B01J 2219/00083;
(Continued)

(56) References Cited

U.S. PATENT DOCUMENTS 4,125,566 A    11/1978  Trin Dinh et al.
4,347,124 A     8/1982  Shimoiizaka et al.
(Continued)

FOREIGN PATENT DOCUMENTS

CN    105378034 A    3/2016
EP    0 147 873 A1    7/1985
(Continued)

OTHER PUBLICATIONS

International Search Report, issued in PCT/EP2017/084813, dated Feb. 16, 2018.
(Continued)

*Primary Examiner* — Derek N Mueller
(74) *Attorney, Agent, or Firm* — Birch, Stewart, Kolasch & Birch, LLP

(57) ABSTRACT

A process for the production of a hydrocarbon fluid includes the step of catalytically hydrogenating a hydrocarbon cut in presence of both a dearomatization catalyst and a dewaxing catalyst in a single slurry reactor. A hydrocarbon fluid is also disclosed as being obtainable by the process.

19 Claims, 1 Drawing Sheet

(51) Int. Cl.
    *B01J 8/10*           (2006.01)
    *C10G 45/48*        (2006.01)

(52) U.S. Cl.
    CPC ............. *B01J 2208/00141* (2013.01); *B01J 2208/00867* (2013.01); *C10G 2300/1059* (2013.01); *C10G 2300/301* (2013.01); *C10G 2300/304* (2013.01)

(58) Field of Classification Search
    CPC ..... B01J 8/085; B01J 8/087; B01J 8/10; B01J 8/222; C10G 2300/1059; C10G 2300/301; C10G 2300/304; C10G 45/46; C10G 45/48; C10G 45/60; C10G 45/64
    See application file for complete search history.

(56) References Cited

U.S. PATENT DOCUMENTS

| | | | |
|---|---|---|---|
| 4,447,315 | A | 5/1984 | Lamb et al. |
| 4,478,955 | A | 10/1984 | Pesa et al. |
| 4,648,957 | A | 3/1987 | Graziani et al. |
| 4,943,672 | A | 7/1990 | Hamner et al. |
| 5,059,299 | A | 10/1991 | Cody et al. |
| 5,855,767 | A | 1/1999 | Powers et al. |
| 6,340,430 | B1 | 1/2002 | Wood |
| 6,517,704 | B1 | 2/2003 | Carroll et al. |
| 2009/0159489 | A1 | 6/2009 | Lopez et al. |
| 2013/0075303 | A1* | 3/2013 | Heraud ............... B01J 37/20 208/50 |
| 2015/0014216 | A1* | 1/2015 | Sundararaman ....... C10G 65/12 208/49 |

FOREIGN PATENT DOCUMENTS

| | | |
|---|---|---|
| EP | 0 583 836 A1 | 2/1994 |
| EP | 0 668 342 A1 | 8/1995 |
| EP | 0 776 959 A2 | 6/1997 |
| GB | 2 077 289 A | 12/1981 |
| RU | 2561918 C2 | 9/2015 |
| WO | WO 99/20720 A1 | 4/1999 |
| WO | WO 99/34917 A1 | 7/1999 |
| WO | WO 99/47626 A1 | 9/1999 |
| WO | WO 2011/143396 A2 | 11/2011 |
| WO | WO 2014/090757 A1 | 6/2014 |
| WO | WO 2015/004329 A1 | 1/2015 |
| WO | WO 2015/027043 A1 | 2/2015 |
| WO | WO 2016/185047 A1 | 11/2016 |

OTHER PUBLICATIONS

Written Opinion of the International Searching Authority, issued in PCT/EP2017/084813, dated Feb. 16, 2018.
Russian Office Action for Russian Application No. 2019121485, dated Mar. 30, 2021, with English translation.
Chinese Office Action and Search Report for Chinese Application No. 201780081742.3, dated Oct. 9, 2021, with English translation.

* cited by examiner

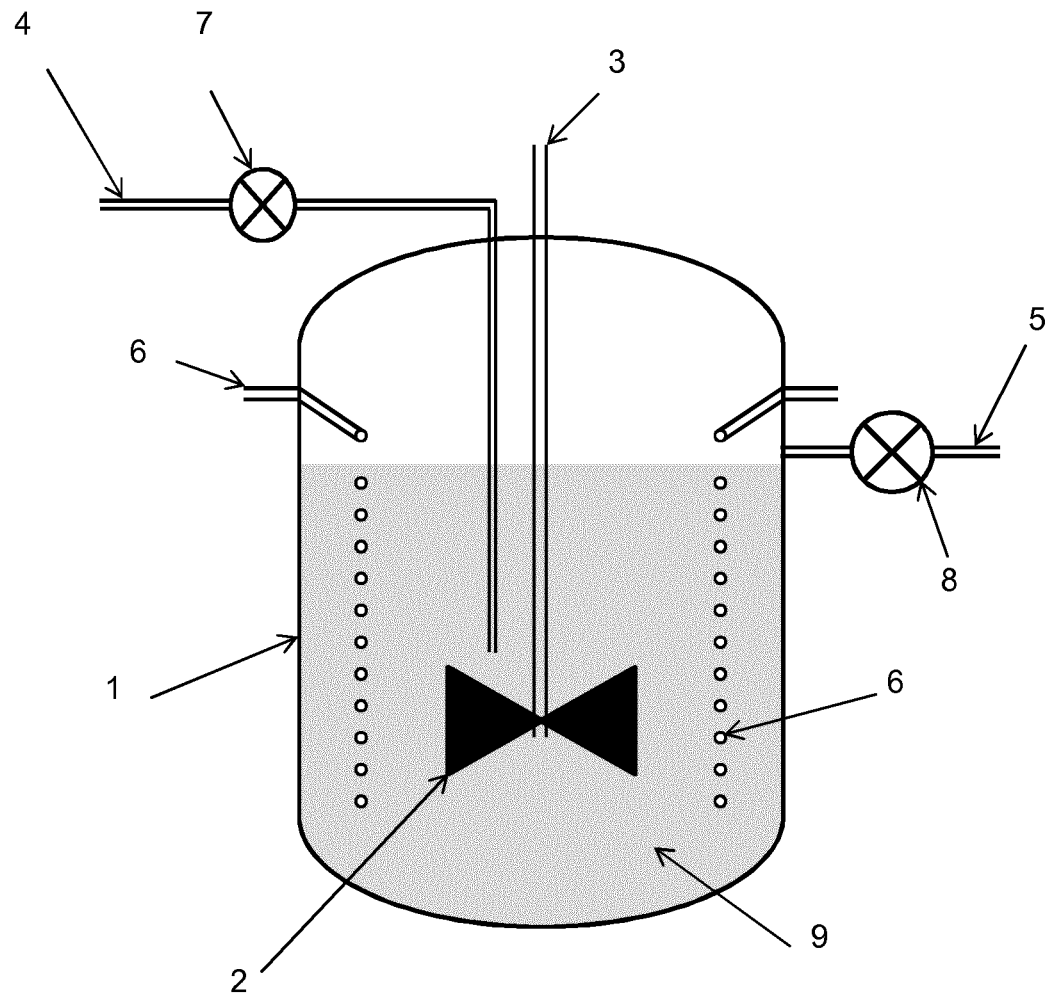

DEWAXING AND DEAROMATIZATION PROCESS OF HYDROCARBON IN A SLURRY REACTOR

FIELD OF THE INVENTION

The invention relates to a hydrotreating process for the production of hydrocarbon fluids with low aromatics content and which exhibit a low pour point.

The invention also relates to the hydrocarbon fluids with low aromatics content and low pour point obtained by the hydrotreating process according to the invention and their uses.

BACKGROUND ART

Hydrocarbon fluids find widespread use as solvents such as in adhesives, cleaning fluids, explosives solvents, for decorative coatings and printing inks, light oils for use in applications such as metal extraction, metalworking or demoulding and industrial lubricants, and drilling fluids. The hydrocarbon fluids can also be used as extender oils in adhesives and sealant systems such as silicone sealants and as viscosity depressants in plasticised polyvinyl chloride formulations and as carrier in polymer formulation used as flocculants for example in water treatment, mining operations or paper manufacturing and also used as thickener for printing pastes. Hydrocarbon fluids may also be used as solvents in a wide variety of other applications such as chemical reactions.

The chemical nature and composition of hydrocarbon fluids varies considerably according to the use to which the fluid is to be put. Important properties of hydrocarbon fluids are the distillation range generally determined by ASTM D-86 or the ASTM D-1160 vacuum distillation technique used for heavier materials, flash point, density, aniline point as determined by ASTM D-611, pour point as determined by ASTM D-5950, aromatic content, sulphur content, viscosity, colour and refractive index.

In particular, fluids with low pour point exhibit improved cold flow properties compared to fluids having a higher pour point. Drilling fluids would typically require low pour point. Due to environmental requirements and safety reasons the aromatics content of hydrocarbon fluids has to be kept at low level and aromatics compounds have to be hydrogenated in order to obtain high purity products. This is why there is a need to provide hydrocarbon fluids with low pour points and low aromatics content.

Processes for the production of fluids with low pour points and low aromatics content are known in the art. Usually, these processes comprise a dewaxing step and a dearomatization step performed separately in fixed bed reactors.

WO 2011/143396 discloses a method for producing a diesel fuel. The process comprises a step of catalytic dewaxing followed by a catalytic dearomatization. The dewaxed effluent from the dewaxing step is quenched before being treated by an aromatic saturation catalyst. The reaction system includes at least one dewaxing stage and one aromatic saturation stage each one including one or more catalytic bed(s). The dewaxing bed and the aromatic saturation bed are separated one from the other.

WO 2014/090757 discloses a process for the production of hydrocarbon solvents with low aromatics and sulphur contents and which exhibit a pour point of −25° C. or less. The process comprises the steps of dewaxing a hydrocarbon fraction followed by hydrodearomatization of all or a part of the dewaxed effluent. The catalytic beds are distributed into one dewaxing section and one dearomatization section. These two sections are separated and comprise fixed beds.

U.S. Pat. No. 6,340,430 discloses a hydrotreating process intended to simultaneously improve the cold flow properties of diesel fuel and to reduce the aromatic hydrocarbon content of jet fuel and diesel of a single broad boiling point range. The catalysts can preferably be in a fixed bed, but can also be slurried.

Yet, there is still a need for a process for producing hydrocarbon fluids with improved cold flow properties, low aromatic contents and which would be cost-saving, especially with a higher conversion rate.

The dewaxing process is known to be exothermic. Thus, another aim of the present invention is to prevent the run-away of the reaction by controlling the exothermicity of the process.

SUMMARY OF THE INVENTION

The invention provides a process for the production of a hydrocarbon fluid comprising the step of catalytically hydrogenating a hydrocarbon cut in presence of both a dearomatization catalyst and a dewaxing catalyst in a single slurry reactor.

According to one embodiment, the reaction temperature is ranging from 180 to 325° C., preferably 190 to 300° C., more preferably from 200 to 280° C. and even more preferably from 250 to 280° C.

According to one embodiment, the reaction pressure is ranging from 30 to 160 bars, preferably 50 to 140 bars, more preferably from 60 to 120 bars and even more preferably from 80 to 100 bars.

According to one embodiment, the dearomatization catalyst is selected from the group consisting of metals of the Group VIII and/or Group VIB metal, preferably supported, such as: nickel, platinum, palladium, rhenium, rhodium, nickel tungstate, nickel molybdenum, molybdenum, cobalt molybdenate, nickel molybdenate on silica and/or alumina carriers or others, preferably nickel supported on alumina.

According to one embodiment, the dewaxing catalyst is selected from the group consisting of silicalite having preferably a silica/alumina ratio greater than 130, alumina, zeolites, MFI zeolites, silicoaluminophosphates, aluminosilicate (Al-oxide Si-dioxide), preferably aluminosilicate, comprising 0 to 10% by weight of at least one metal from group VIII and optionally 0 to 20% by weight of a group VI metal, such as metals chosen from the group consisting of nickel, tungsten, cobalt, molybdenum, platinum, palladium and associations of two or more thereof.

According to one embodiment, the dearomatization catalyst amount is comprised between 0.1 and 6 wt %, preferably between 1 and 5 wt %, and more preferably between 2 and 4 wt %, based on the weight of the hydrocarbon cut.

According to one embodiment, the dewaxing catalyst amount is comprised between 0.1 and 6 wt %, preferably between 0.2 and 4 wt %, and more preferably between 0.3 and 3 wt %, based on the weight of the hydrocarbon cut.

According to one embodiment, the weight ratio of the dewaxing catalyst amount to the dearomatization catalyst amount is preferably between 1:1 and 1:10, more preferably between 1:1 and 1:5, and even more preferably between 1:2 and 1:4.

According to one embodiment, the cut is a gas oil fraction, preferably obtained by a refining process, such as a fraction selected from among the atmospheric distillation gas oils, vacuum distillation gas oils, hydrocracked gas oils, gas oils from catalytic cracking, gas oils from visbreaking, coking gas oils, gas oils derived from gas deposit, deasphalted gas oils, gas oils derived from the hydrotreating of heavy fractions, such as atmospheric residue and vacuum distillation gas oil or vacuum gas oil, gas oils with a sulphur content greater than 15 ppm being desulphurised by hydrotreating and/or hydrocracking, or derived from several gas oil fractions referenced in the list above.

According to one embodiment, the cut is a heavy fraction, preferably a heavy gasoil, more preferably a gasoil having a final boiling point above 300° C., especially above 340° C., and especially more than 360° C., advantageously with an initial boiling point above 240° C., typically above 280° C. According to one embodiment, the hydrocarbon fluid obtained has a boiling point in the range of 200° C. to 450° C., preferably 250° C. to 420° C., more preferably from 300° C. to 400° C. and/or has boiling range below 80° C., preferably below 60° C., advantageously below 50° C.

According to one embodiment, the hydrocarbon fluid obtained has an aromatic content less than 1 wt %, more preferably less than 0.6 wt %.

According to one embodiment, the hydrocarbon fluid obtained has a pour point lower than −40° C., preferably lower than −45° C.

According to one embodiment, the process is carried out continuously, preferably in a Continuous Stirred Tank Reactor.

The invention also provides the use of a hydrocarbon fluid obtainable by the process according to the invention as drilling fluid, in hydraulic fracturing, in mining, in water treatments, in industrial solvents, in paint compositions, in explosives, in printing inks, in oil dispersants, in food processing industry and in metal working fluids, such as cutting fluids, electric discharge machining (EDM) fluids, rust preventives, coating fluids and aluminium rolling oils, and in concrete demoulding formulations, in industrial lubricants such as shock absorbers, insulation oils, hydraulic oils, gear oils, turbine oils, textile oils and in transmission fluids such as automatic transmission fluids or manual gear box formulations.

BRIEF DESCRIPTION OF THE DRAWINGS

FIG. 1 shows a schematic drawing of one configuration of a reactor that can be used in the invention.

DESCRIPTION OF EMBODIMENTS OF THE INVENTION

The invention relates especially to a process for the production of a hydrocarbon fluid with a low aromatic content and a low pour point, e.g. below −40° C. comprising the step of catalytically hydrogenating a hydrocarbon cut in presence of both a dearomatization catalyst and a dewaxing catalyst in a single batch or continuous slurry reactor under conditions effective to proceed with dearomatization and dewaxing.

Hydrocarbon Cuts as Feed
i) Hydrocarbon Cut Originating from a Gas-to-Liquid Process:

A Gas to liquids (GTL) process is a refinery process that converts natural gas or other gaseous hydrocarbons into longer-chain hydrocarbons such as gasoline or diesel fuel. Methane-rich gases are converted into liquid synthetic fuels either via direct conversion or via syngas as an intermediate, for example using the Fischer Tropsch process, Methanol to Gasoline process (MTG) or Syngas to gasoline plus process (STG+). For the Fischer Tropsch process, the effluents produced are Fischer-Tropsch derived.

By "Fischer-Tropsch derived" is meant that a hydrocarbon composition is, or derives from, a synthesis product of a Fischer-Tropsch condensation process. The Fischer-Tropsch reaction converts carbon monoxide and hydrogen into longer chain, usually paraffinic, hydrocarbons:

$$n(CO+2H_2)=(-CH_2-)_n+nH_2O+\text{heat},$$

in the presence of an appropriate catalyst and typically at elevated temperatures (e.g., 125 to 300° C., preferably 175 to 250° C.) and/or pressures (e.g., 5 to 100 bars, preferably 12 to 50 bars). Hydrogen/carbon monoxide ratios other than 2:1 may be employed if desired. The carbon monoxide and hydrogen may themselves be derived from organic or inorganic, natural or synthetic sources, typically either from natural gas or from organically derived methane. For example, it can also be derived from biomass or from coal.

The collected hydrocarbon composition containing a continuous iso-paraffinic series as described above may preferably be obtained by hydroisomerisation of a paraffinic wax, preferably followed by dewaxing, such as solvent or catalytic dewaxing. The paraffinic wax is preferably a Fischer-Tropsch derived wax.

Hydrocarbon cuts may be obtained directly from the Fischer-Tropsch reaction, or indirectly for instance by fractionation of Fischer-Tropsch synthesis products or preferably from hydrotreated Fischer-Tropsch synthesis products.

Hydrotreatment preferably involves hydrocracking to adjust the boiling range (see, e.g., GB-B-2077289 and EP-A-0147873) and/or hydroisomerisation, which can improve cold flow properties by increasing the proportion of branched paraffins. EP-A-0583836 describes a two-step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. The desired gas oil fraction(s) may subsequently be isolated for instance by distillation.

Other post-synthesis treatments, such as polymerization, alkylation, distillation, cracking-decarboxylation, isomerisation and hydroreforming, may be employed to modify the properties of Fischer-Tropsch condensation products, as described for instance in U.S. Pat. Nos. 4,125,566 and 4,478,955. Examples of Fischer-Tropsch processes which for example can be used to prepare the above-described Fischer-Tropsch derived collected hydrocarbon composition are the so-called commercial Slurry Phase Distillate technology of Sasol, the Shell Middle Distillate Synthesis Process and the "AGC-21" Exxon Mobil process. These and other processes are for example described in more detail in EP-A-776959, EP-A-668342, U.S. Pat. Nos. 4,943,672, 5,059,299, WO-A-9934917 and WO-A-9920720.

Typically, the gas to liquid feedstock shall contain less than 1 ppm sulphur as measured according to ASTM method D5453, less than 1 wt. % aromatics as measured according to method IP391, and have a density lower or equal to 0.800 g/cm$^3$ as measured according to method ASTMD4052.
ii) Hydrocarbon Cuts from Fossil Origin, Gas Condensates, Hydrodeoxygenated Hydrocarbon Cuts from the Biomass:
    a) According to the invention, hydrocarbon cut from biological origin used as feedstock can be produced from biological raw materials from the group consisting of vegetable oils, animal fats, fish oils, and mixtures thereof. Suitable biological raw materials include rapeseed oil, canola oil, colza oil, tall oil, sunflower oil, soybean oil, hemp oil, olive oil, linenseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Condensation products, esters, or other derivatives obtained from biological raw materials may also be used as starting materials.

The hydrocarbon fluid from biological origin is then produced by using for instance a process first comprising a hydrodeoxygenation (HDO) step for decomposing the structure of the biological ester or triglyceride constituent, and for removing oxygen, phosphorus and sulphur compounds, concurrently hydrogenating the olefinic bonds, followed by isomerization of the product thus obtained, thus branching the hydrocarbon chain and improving the low temperature properties of the paraffin. The product may for instance be fractionated to give the desired fractions.

b) Gas Condensates is a product derived from natural gas. It corresponds to a mixture of liquid hydrocarbons with more than four carbon atoms per molecule. Under natural conditions, a gas condensate is a solution of heavier hydrocarbons. The gas condensate separated from natural gas at reduced pressure and/or temperature by reverse condensation is a colourless or slightly coloured liquid of density 700-800 kg/m$^3$, which starts boiling at 30-70° C. The composition of a gas condensate corresponds approximately to the gasoline or kerosene fraction of crude oil or to a mixture of them.

c) According to the invention hydrocarbon cuts can be typical refinery feeds of any type including feedstock from distillate hydrocracker unit, but also feedstock having high aromatic contents like standard ultra-low sulphur Diesel feedstock, heavy Diesel or jet type.

For example, it is possible to use heavy fractions such as cuts from heavy hydrocarbon fractions derived from the unit for catalytic cracking of vacuum distillates (FCC-Fluid Catalytic Cracking), such as fractions of Light Cycle Oils (LCO) or petroleum residues (slurry) or hydrocracked gas oils or hydrocracked vacuum gas oils.

The feed constituted by a gas oil fraction obtained by any refining process, in particular refers to a fraction selected from among the atmospheric distillation gas oils, vacuum distillation gas oils, hydrocracked gas oils, gas oils from catalytic cracking, gas oils from visbreaking, coking gas oils, gas oils derived from gas deposit, deasphalted gas oils, gas oils derived from the hydrotreating of heavy fractions (Atmospheric Residue and vacuum distillation gas oil or VGO), gas oils with a sulphur content greater than 15 ppm being desulphurised by hydrotreating and/or hydrocracking prior to treatment according to the method of the invention. It would not be going beyond the scope of the invention if this feed were to be derived from several gas oil fractions referenced in the list here above.

The invention is especially suited for heavy fractions notably heavy gasoils. Heavy gasoil is especially defined with respect to its boiling range, and refers to gasoil having a final boiling point above 300° C., especially above 340° C., and especially more than 360° C. The initial boiling point is not especially relevant and can be below or above 240° C. for example, and typically above 280° C.

The standard ultra-low sulphur Diesel contains less than 10 ppm sulphur as measured according to EN ISO 20846, has a density comprised between 0.820 and 0.845 g/cm$^3$ as measured according to method EN ISO 12185, and generally answers the specifications of EuroV Diesel as defined in European Directive 2009/30/EC. It is generally obtained by a severe hydrodesulphuration of straight run gasoil cuts from atmospheric distillation.

Typical refinery feeds can also be hydrocracked to obtain shorter and simple molecules by the addition of hydrogen under high pressure in the presence of a catalyst. Descriptions of hydrocracking processes may be found in Hydrocarbon Processing of November 1996 pages 124 to 128, hydrocracking science and technology, 1996, U.S. Pat. Nos. 4,347,124, 4,447,315, WO-A-99/47626

Any cut and feed can be blended; for example the optionally hydrocracked feed may be blended with the hydrocarbon cut originating from of a gas-to-liquid process and/or gas condensates and/or hydrodeoxygenated hydrocarbon cuts from the biomass in a proportion of 5 to 95 wt. % of each respective component.

The sulphur content of the feed is preferably low, typically below 15 ppm, preferably below 10 ppm. Hydrodesulphuration is a known treatment.

Fractionating is also possible after the process of the invention has been carried out, especially for fractionating out the light fractions that may be formed during dewaxing.

Reaction Process

The hydrodewaxing/hydrodearomatization process takes place in a single slurry reactor. Slurry reactors are well known in the art.

By "single reactor" it is meant that all the reactants are introduced in only one reactor and are able to react all in the same reactor.

Slurry reactors usually contain a catalyst (solid) suspended in a liquid, through which a gas (hydrogen) is bubbled. It operates a three-phase reaction. They can operate in either batch or continuous mode. Preferentially the process according to the invention is performed in a slurry reactor operating in a batch mode. A preferred reactor is thus the well known CSTR (Continuous Stirred Tank Reactor).

The catalyst may be in the form of granules, pellets or any type of supported catalyst or unsupported catalyst. Inside the reactor the catalyst is slurried in a liquid. Gas reactant, here hydrogen, is bubbled into the reactor. The gas is then absorbed into the liquid from the bubbles' surface.

Slurry reactors are known in the art. One possible reactor is the one of FIG. 1, which is as follows:

FIG. 1 shows an example of tank 1 according to the invention filled with a reactive medium 9. The tank 1 comprises a stirring device 2, a gas inlet 3, an inlet feed line 4, an outlet feed line 5 and a thermal device 6. In FIG. 1, the gas inlet is a hollow tube designed to provide hydrogen in the neighbourhood of the stirring baffles of the stirring device 2. In FIG. 1, an inlet flow valve 7 and an outlet flow valve 8 have been represented. During the dewaxing and dearomatization process, the feed such as diesel is introduced into the tank 1 through the inlet feed line 4 and the product is extracted out through the outlet feed line 5. In FIG. 1, the thermal device 6 is cooling coils which can be regulated by thermocouples, not represented in FIG. 1, and allows maintaining the reactive medium temperature within the prescribed range.

Hence, the invention also relates to the process as carried out in a continuous stirred-tank reactor which comprises:
a tank (1) for containing a reactive medium,
a stirring device (2),
a gas inlet (3) for injecting hydrogen,
an inlet feed line (4) for introducing the hydrocarbon feed within the tank, an outlet feed line (5) for extracting the effluent out of the tank, a thermal device (6) for measuring and controlling the temperature within the reactive medium so as to maintain the reactive medium temperature within a range of ±5° C.

The agitation will preferably be mechanic, magnetic agitation being for small scale reactors (with typically higher rotation speed values than for large scale reactor with mechanic agitation).

In order to provide a mechanic agitation, the reactor may be provided with a turbine and a rotating arm equipped with baffles. The stirring device may be a rotating arm comprising a hollow tube, at least one hole and stirring baffles or blades. The rotation speed of the rotating arm can range from 100 to 1000 rpm. Preferably, the at least one hole of the rotating arm is at the neighbourhood of the stirring baffles and the inlet feed line of the reactor is located at the neighbourhood of the hole. The neighbourhood of the stirring baffles can notably mean a zone wherein the action of baffles is visible in the medium, i.e. the baffles modify the flow of the medium. The expression "at the neighbourhood" preferably means at a distance of less than 15 cm, more preferably of less than 10 cm.

Hence, the hole or holes of the rotating arm is or are located at a distance of less than 15 cm, preferably less than 10 cm of the stirring baffles and the inlet feed line of the reactor is located at a distance of less than 15 cm, preferably of less than 10 cm of the hole or holes of the rotating arm.

The thermal device for measuring and controlling the temperature within the reactive medium so as to maintain the reactive medium temperature within the prescribed range (set temperature ±5° C.) comprises devices for removing heat and devices for measuring the temperature.

The device for removing the heat can be chosen from double jacket, internal heat exchanger, cooling coils, external heat exchanger.

The device for measuring the temperature can be a plurality of thermocouples.

The use of a slurry reactor has many advantages such as good temperature control, good heat recovery, constant overall catalytic activity maintained easily by addition of a small amount of catalyst, especially useful for catalysts that cannot be pelletized. The large heat capacity of reactor acts as a safety feature against explosions.

The hydrogenation conditions for the dewaxing and dearomatization are typically the following:

Pressure: is ranging from 30 to 120 bars, preferably from 50 to 140 bars, more preferably from 60 to 120 bars, even more preferably from 80 to 100 bars.

Temperature: is ranging from 185 to 325° C., preferably from 190 to 300° C., more preferably from 200 to 280° C., even more preferably from 250 to 280° C. A temperature below 300° C. is preferred for higher dearomatization conversion.

Liquid hourly space velocity (LHSV): expressed in $hr^{-1}$, corresponding to the ratio of the flow of feed divided by the volume of catalyst, is from 0.05 to 2 $hr^{-1}$, preferably from 0.1 to 1 $h^{-1}$.

Hydrogen treat rate: can be adapted to maintain sufficient hydrogen pressure in the reactor. The flow rate can be from 50 to 2500 Nl/l of feed, especially from 100 to 500 Nl/l.

Hydrodewaxing Catalyst

The terms "dewaxing" and "hydrodewaxing" are used interchangeably and designate a process of removing and/or isomerising paraffin waxes.

Hydrodewaxing takes place using a catalyst. Typical hydrodewaxing catalysts include but are not limited to silicalite catalysts having a silica/alumina ratio greater than 130, preferably higher than 150. Other catalysts include silicalites, zeolites such as ZSM-5 that may support transition metals or a zeolite ZSM48 that may support platinum/palladium type metals. Non-zeolitic molecular sieve (NZMS) material, essentially free of Y zeolite, can be used. Mesoporous catalysts can be used. The hydrodewaxing catalyst can also be silicalite, aluminosilicate (Al-oxide Si-dioxide), MFI zeolites and silicoaluminophosphates (SAPOs), with or without metal components as recited below. A preferred catalyst is aluminosilicate (Al-oxide Si-dioxide).

The main catalytic activity is determined by the pores of the dewaxing catalyst. However, a metal may be present, in low amounts. For example the catalyst may comprise 0 to 10% by weight of at least one metal from group VIII and optionally 0 to 20% by weight of a group VI metal, such as a hydrogenation metal or metal couple selected from cobalt/molybdenum, nickel/tungsten, cobalt/tungsten, nickel/molybdenum and platinum/palladium, where each metal of each couple can serve as a unique hydrogenation metal.

Such catalysts useful for the invention are disclosed in the prior art such as e.g. WO2014/090757, U.S. Pat. Nos. 6,340,430, 6,517,704, 5,855,767 and WO2011/143396.

The hydrodewaxing catalyst can be present in the reactor in an amount ranging from 0.5 to 10 wt %, preferably from 1 to 6 wt %, more preferably from 2 to 4 wt %, based on the total amount of reactant added in the reactor.

Hydrodearomatization Catalyst

The terms "dearomatization" and "hydrodearomatization" are used interchangeably and designate a process of hydrogenating aromatic compounds.

Hydrodearomatization takes place using a catalyst. Typical hydrodearomatization catalysts include but are not limited to Group VIII and/or Group VIB metal, preferably supported, such as: nickel, platinum, palladium, rhenium, rhodium, nickel tungstate, nickel molybdenum, molybdenum, cobalt molybdenate, nickel molybdenate on silica and/or alumina carriers. Mesoporous catalysts can be used. A preferred catalyst is Ni-based and is supported on an alumina carrier, having a specific surface area varying between 50 and 300 $m^2/g$ of catalyst.

According to a preferred embodiment, the hydrodearomatization catalyst includes one single metal selected from Group VIII and/or Group VIB metal, preferably nickel.

Such catalysts useful for the invention are disclosed in the prior art such as e.g. WO2014/090757, U.S. Pat. Nos. 6,340,430, 6,517,704, 5,855,767 and WO2011/143396.

The hydrodearomatization catalyst can be present in the reactor in an amount ranging from 0.5 to 6 wt %, preferably from 0.8 to 4 wt %, more preferably from 1 to 3 wt %, based on the total amount of reactant added in the reactor.

The skilled man is aware of the various requirements for designing efficient dewaxing and dearomatization catalysts.

Further Steps

The reaction product exiting the reactor, after having been separated from the catalyst slurry, may be subjected to further treatments. Further dearomatization by hydrogenation in further reactors can be carried out in order to achieve deep dearomatization. Further hydrogenation processes are known in the art.

Fractionation can also be carried out to produce fluids with a defined boiling range. Fractionation is a process known in the art for separating the light fraction which can be produced during the dewaxing (which in standard fixed beds processes is eliminated by the top flash vessel).

Fluids of the Invention

The fluids produced according to the process of the invention possess outstanding properties, in terms of aniline point or solvency power, molecular weight, vapour pressure, viscosity, defined evaporation conditions for systems where drying is important, and defined surface tension.

The fluids produced according to the process of the invention have a boiling range from 50 to 400° C. and also exhibit an enhanced safety, due to a low aromatics content, typically less than 1 wt %, more preferably less than 0.6 wt %. This makes them suitable for use in a variety of applications. This is especially useful for high temperature boiling products, typically products boiling in the range 300-400° C., preferably 320-380° C.

The fluids prepared according to the process of the present invention also have an extremely low sulphur content, typically less than 5 ppm, even less than 3 ppm and preferably less than 0.5 ppm, at a level too low to be detected by the usual low-sulphur analyzers.

The fluids produced by the process of the present invention have a variety of uses for example in drilling fluids, in hydraulic fracturing, in mining, in water treatments, in industrial solvents, in paint compositions, in explosives, in printing inks, in oil dispersants, in food processing industry and in metal working fluids, such as cutting fluids, electric discharge machining (EDM) fluids, rust preventives, coating fluids and aluminium rolling oils, and in concrete demoulding formulations. They can also be used in industrial lubricants such as shock absorbers, insulation oils, hydraulic oils, gear oils, turbine oils, textile oils and in transmission fluids such as automatic transmission fluids or manual gear box formulations.

In all this foreseen uses, the Initial Boiling Point (IBP) to Final Boiling Point (FBP) range is selected according to the particular use and composition. The fluids are also useful as components in adhesives, sealants or polymer systems such as silicone sealant, modified silane polymers where they act as extender oils and as viscosity depressants for polyvinyl chloride (PVC) pastes or Plastisol formulations.

The fluids produced according to the process of the present invention may also be used as new and improved solvents, particularly as solvents for resins. The solvent-resin composition may comprise a resin component dissolved in the fluid, the fluid comprising 5 to 95% by total volume of the composition.

The fluids produced according to the process of the present invention may be used in place of solvents currently used for inks, coatings and the like.

The fluids produced according to the process of the present invention may also be used to dissolve resins such as: acrylic-thermoplastic, acrylic-thermosetting, chlorinated rubber, epoxy (either one or two part), hydrocarbon (e.g., olefins, terpene resins, rosin esters, petroleum resins, coumarone-indene, styrene-butadiene, styrene, methyl-styrene, vinyl-toluene, polychloroprene, polyamide, polyvinyl chloride and isobutylene), phenolic, polyester and alkyd, polyurethane and modified polyurethane, silicone and modified silicone (MS polymers), urea, and, vinyl polymers and polyvinyl acetate.

Examples of the type of specific applications for which the fluids and fluid-resin blends may be used include coatings, cleaning compositions and inks. For coatings the blend preferably has high resin content, i.e., a resin content of 20% to 80% by volume. For inks, the blend preferably contains a lower concentration of the resin, i.e., 5%-30% by volume.

In yet another embodiment, various pigments or additives may be added.

The fluids produced by the process of the present invention can be used as cleaning compositions for the removal of hydrocarbons.

The fluids may also be used in cleaning compositions such as for use in removing ink, more specifically in removing ink from printing.

In the offset printing industry it is important that ink can be removed quickly and thoroughly from the printing surface without harming the metal or rubber components of the printing machine. Further there is a tendency to require that the cleaning compositions are environmentally friendly in that they contain no or hardly any aromatic volatile organic compounds and/or halogen containing compounds. A further trend is that the compositions fulfil strict safety regulations. In order to fulfil the safety regulations, it is preferred that the compositions have a flash point of more than 62° C., more preferably a flash point of 90° C. or more. This makes them very safe for transportation, storage and use. The fluids produced according to the process of the present invention have been found to give a good performance in that ink is readily removed while these requirements are met.

The fluids produced according to the process of the invention are also useful as continuous oil phase for drilling fluids. The fluid may also be used as dispersed in a continuous aqueous phase of a penetration rate enhancer.

Fluids used for offshore or on-shore applications need to exhibit acceptable biodegradability, human, eco-toxicity, eco-accumulation and lack of visual sheen credentials for them to be considered as candidate fluids for the manufacturer of drilling fluids. In addition, fluids used in drilling uses need to possess acceptable physical attributes. These generally include a viscosity of less than 4.0 mm$^2$/s at 40° C., a flash value of less than 100° C. and, for cold weather applications, a pour point of −40° C. or lower. Typically, these properties can only be attained through the use of expensive synthetic fluids such as hydrogenated polyalphaolefins, as well as unsaturated internal olefins and linear alpha-olefins and esters. These properties can however be obtained in fluids produced according to the process of the present invention.

Drilling fluids may be classified as either water-based or oil-based, depending upon whether the continuous phase of the fluid is mainly oil or mainly water. Water-based fluids may however contain oil and oil-based fluids may contain water. Fluids produced according to the process of the invention are particularly useful as oil phase.

Typically preferred ASTM D-86 boiling ranges for the uses of the fluids are as follows:

Fluids preferred for printing ink solvents (sometimes known as distillates) have boiling ranges in the ranges of 280° C. to 315° C. and 300° C. to 355° C.;

Fluids preferred for explosives, concrete demoulding, industrial lubricants, transmission fluids and metal working fluids have boiling ranges in the ranges of 235° C. to 365° C., 280° C. to 325° C. and 300° C. to 360° C.;

Fluids preferred as extenders for sealants have boiling ranges in the ranges of 280° C. to 325° C. or 300° C. to 360° C.;

Fluids preferred as viscosity depressants for polyvinyl chloride plastisols have boiling ranges in the ranges of 280° C. to 315° C. and 300° C. to 360° C.;

Fluids preferred as carrier for polymeric composition used in water treatment, mining operation or printing pastes have boiling ranges in the ranges of 280° C. to 315° C. and 300° C. to 360° C.;

Fluids preferred for crop protection application have boiling ranges in the range of 300 and 370° C., such fluids being used in combination with hydrocarbon fluids such as isodewaxed hydrocarbons or any hydrocarbons having comparable properties such as viscosity;

For pharmacological applications, suitable fluids are those having boiling ranges in the ranges of 275° C. to 330° C., 290° C. to 380° C. and 300 to 370° C.

The fluids of the invention are especially suited for high boiling ranges application. Preferred fluids have boiling ranges with an initial boiling point above 300° C.

EXAMPLES

The following examples illustrate the invention without limiting it.

Example 1

Table 1 shows the characteristics of the feedstock (heavy gasoil) used during the tests, and the standards used in the present description.

TABLE 1

| Characteristic | Standards | Unit | Heavy gasoil |
|---|---|---|---|
| Aromatic | NF EN 12916 | wt % | 9.8 |
| N-paraffin | GC | wt % | 27.7 |
| Isoparaffin | GC | wt % | 38.4 |
| Naphthene | GC | wt % | 24.1 |
| Mononaphthene | GC | wt % | 23.2 |
| Olefin | ASTM D2710 | $Br_2$/100 g | 2.9 |
| Viscosity (40° C.) | ASTM D445 | cSt | 7.7 |
| Sulphur | ASTM D5453 | ppm | 2.4 |
| Nitrogen | ASTM D4629 | ppm | <0.5 |
| Distillation cut | ASTM D86 | ° C. | 296.8-369.3 |
| Pour point | ASTM D5950 | ° C. | 12 |

The present example provides the preparation of a hydrocarbon fluid according to the process of the present invention, that is to say a dual hydrodewaxing HDA and hydrodearomatization HDW process of heavy diesel performed in a single batch slurry reactor (HDW+HDA).

This process is compared to a comparative process (CP1) corresponding to the prior art WO2014/090757A1. The comparative process consists in the dewaxing of a hydrocarbon cut followed by dearomatization performed in one continuous fixed-bed reactor.

The conditions for the dual HDW+HDA process according to the invention and for the dewaxing reactor (CP1-HDW) and the dearomatization reactor (CP1-HDA) of the comparative process are given in table 2.

The dual HDW+HDA process according to the present invention was carried out according to the following procedure:

Heavy gasoil (832.02 g), HDA catalyst (1% wt) and the HDW catalyst (3% wt) are introduced in the reactor;

The reactor is purged three times with 5 bars of nitrogen gas;

The stirrer is set on (1500 rpm). The reactor content is heated up to the starting temperature. When this temperature is reached, the hydrogen valve opens and the pressure is set to the reaction pressure.

The speed of the reaction is monitored by the hydrogen flow through a flowmeter. The integral of the hydrogen flow gives the total consumed volume of hydrogen and the conversion of the reaction.

The reaction is pursued until the hydrogen uptake is finished or until the targeted conversion is reached, then the hydrogen flow is interrupted and the reactor cooled down.

At filtration temperature, the reactor is slowly vented to release the hydrogen. The reactor is then inertized three times with 5 bars nitrogen.

The reactor content is filtered using nitrogen pressure through a heated Nutsche filter.

Table 2 shows the reaction conditions for the dual HDW+HDA process and the CP1 process.

TABLE 2

| Parameter | Dual HDW + HDA (invention) | CP1-HDW (prior art) | CP1-HDA (prior art) |
|---|---|---|---|
| Pressure (bar) | 80 | 30 | 160 |
| Reaction temperature (° C.) | 250-280 | 305 | 245 |
| Catalyst | Al-oxide Si-dioxide | Ni—Al | Al-oxide Si-dioxide | Ni—Al |
| Contact time (hr) | 15 | 2.5 | 2.5 |

Table 3 shows the characteristics of the products obtained after the HDA+HDW process according to the invention and after the comparative process.

TABLE 3

| Characteristic | Dual HDW + HDA (Invention) | CP1-HDW (prior art) + CP1-HDA (prior art) |
|---|---|---|
| Aromatic (ppm) | 5382 | 127 |
| Viscosity (at 40° C.) ($mm^2$/s) | 8.7 | 8.7 |
| Initial boiling point (° C.) | 76.9 | 314 |
| 5% boiling point (° C.) | 311 | |
| Final boiling point (° C.) | 377.1 | 367.3 |
| Pour point (° C.) | −48 | −40 |

The results show that the process according to the invention gives a fluid with improved cold flow properties compared with a fluid obtained from a two-step process known in the art.

Example 2

The aim of the present example is to compare the HDW+HDA process according to the invention performed in a single batch slurry reactor with a hydrodearomatization process performed alone in the same batch slurry reactor (CP2) and a hydrodewaxing process performed alone in the same batch slurry reactor (CP3), the hydrodewaxing process being carried out first and then the hydrodearomatization process being carried out. The example compares the properties of the fluid resulting from the invention, with the fluid that is obtained by the sequential hydrodewaxing then hydrodearomatization process.

The conditions for the hydrodearomatization process (CP2-HDA), the hydrodewaxing process (CP3-HDW) and the dual HDW+HDA process of the present invention are given in table 4. Otherwise the other conditions are identical to example 1.

The procedure for the HDA, the HDW and the dual HDW+HDA process according to the invention was the same as the one given in example 1.

TABLE 4

| Parameter | Dual HDW + HDA (invention) | | CP3-HDW (prior art) | CP2-HDA (prior art) |
|---|---|---|---|---|
| Pressure (bar) | 80 | | 30-80 | 30-80 |
| Reaction temperature (° C.) | 250-280 | | 200-280 | 200-250 |
| H$_2$ flowrate (Nl/l) | 6 | | 6 | 6 |
| Feed (g) | 834.8 | | 833.2 | 832.0 |
| Catalyst | Al-oxide Si-dioxide | Ni—Al | Al-oxide Si-dioxide | Ni—Al |
| Catalyst amount (g) | 8.3 | 8.3 | 8.3 | 8.3 |
| Contact time (hr) | 15 | | 11 | 7 |

Table 5 shows the characteristics of the products obtained after the HDA, HDW and HDW+HDA processes. Thus, the hydrodearomatization and hydrodewaxing processes performed separately one from the other in a batch slurry reactor are compared to the hydrodearomatization and hydrodewaxing processes performed together in the same single batch slurry reactor. In particular, the aromatics content of the fluid after the HDA process and the pour point of the fluid after the HDW process are compared to those after the HDW+HDA process.

TABLE 5

| Characteristic | Dual HDW + HDA (Invention) | HDW (prior art) | HDA (prior art) |
|---|---|---|---|
| Aromatic (ppm) | 5382 | 125000 | 7328 |
| Viscosity(at 40° C.) (mm$^2$/s) | 8.7 | 8.7 | 9.8 |
| Initial boiling point (° C.) | 76.9 | 75.7 | 314.8 |
| 5% boiling point (° C.) | 311 | 328.2 | 328.2 |
| Final boiling point (° C.) | 377.1 | 380.3 | 378.3 |
| Pour point (° C.) | −48 | −6 | 3 |

The results show that the product obtained by the process exhibits a lower aromatics content than the product obtained by HDA alone and a lower pour point compared to the product obtained by HDW alone. This means that the fluid obtained from the dual HDW+HDA process according to the invention has better cold flow properties.

The invention claimed is:

1. A process for the production of a hydrocarbon fluid comprising the step of catalytically hydrogenating a hydrocarbon cut in presence of both a dearomatization catalyst and a dewaxing catalyst in a single slurry reactor, wherein the hydrocarbon cut has a sulphur content below 15 ppm, wherein the reaction temperature is ranging from 180 to 325° C.

2. The process according to claim 1, wherein the reaction pressure is ranging from 30 to 160 bars.

3. The process according to claim 1, wherein the dearomatization catalyst is selected from the group consisting of metals of the Group VIII and/or Group VIB.

4. The process according to claim 1, wherein the dewaxing catalyst is selected from the group consisting of silicalite alumina, zeolites, MFI zeolites, silicoaluminophosphates, aluminosilicate (Al-oxide Si-dioxide).

5. The process according to claim 1, wherein the dearomatization catalyst amount is comprised between 0.1 and 6 wt %, based on the weight of the hydrocarbon cut.

6. The process according to claim 1, wherein the dewaxing catalyst amount is comprised between 0.1 and 6 wt %, based on the weight of the hydrocarbon cut.

7. The process according to claim 1, wherein the weight ratio of the dewaxing catalyst amount to the dearomatization catalyst amount is between 1:1 to 1:10.

8. The process according to claim 1, wherein the cut is a gas oil fraction.

9. The process according to claim 8 wherein the cut is a-heavy gasoil.

10. The process according to claim 1, wherein the hydrocarbon fluid obtained has an initial boiling point and a final boiling point in the range of 200° C. to 450° C. and/or has a boiling range below 80° C.

11. The process according to claim 1, wherein the hydrocarbon fluid obtained has an aromatic content less than 1 wt % by weight.

12. The process according to claim 1, wherein the hydrocarbon fluid obtained has a pour point lower than −40° C.

13. The process according to claim 1, carried out continuously.

14. The process according to claim 1, further comprising the step of using the fluid as drilling fluid, in hydraulic fracturing, in mining, in water treatments, in industrial solvents, in paints composition, in explosives, in printing inks, in oil dispersants, in food processing industry and in metal working fluids, electric discharge machining (EDM) fluids, rust preventives, coating fluids and aluminium rolling oils, and in concrete demoulding formulations, in industrial lubricants, insulation oils, hydraulic oils, gear oils, turbine oils, textile oils and in transmission fluids.

15. The process according to claim 3, wherein the dearomatization catalyst is selected from nickel, platinum, palladium, rhenium, rhodium, nickel tungstate, nickel molybdenum, molybdenum, cobalt molybdenate, nickel molybdenate on silica and/or alumina carriers.

16. The process according to claim 4, wherein the dewaxing catalyst is selected from aluminosilicate, comprising 0 to 10% by weight of at least one metal from group VIII and optionally 0 to 20% by weight of a group VI metal.

17. The process according to claim 8, wherein the gas oil fraction is selected from among the atmospheric distillation gas oils, vacuum distillation gas oils, hydrocracked gas oils, gas oils from catalytic cracking, gas oils from visbreaking, coking gas oils, gas oils derived from gas deposit, deasphalted gas oils, gas oils derived from the hydrotreating of heavy fractions.

18. The process according to claim 9, wherein the heavy gasoil has a final boiling point above 300° C.

19. The process according to claim 13, carried out in a Continuous Stirred Tank Reactor.

* * * * *